(12) United States Patent
Schreiber

(10) Patent No.: US 7,236,778 B2
(45) Date of Patent: Jun. 26, 2007

(54) SYSTEM AND METHOD FOR TESTING TRANSCEIVERS

(75) Inventor: Heinz H. Schreiber, Melbourne, FL (US)

(73) Assignee: Northrop Grumman Corporation, Los Angeles, CA (US)

( * ) Notice: Subject to any disclaimer, the term of this patent is extended or adjusted under 35 U.S.C. 154(b) by 175 days.

(21) Appl. No.: 10/241,069

(22) Filed: Sep. 10, 2002

(65) Prior Publication Data

US 2004/0048611 A1    Mar. 11, 2004

(51) Int. Cl.
*H04Q 7/20*    (2006.01)
(52) U.S. Cl. ............... 455/423; 455/67.11; 455/67.14; 455/226.1; 375/224; 375/221
(58) Field of Classification Search ............... 455/325, 455/432, 323, 319, 67.14, 67.11, 63.1, 65, 455/506, 561, 522, 422.1, 115.1, 115.2, 226.1, 455/226.2, 526, 424, 67.4, 277.2, 278.1, 455/423, 69, 703, 550.1, 575.1, 425, 13.3, 455/456.5, 456.6, 272; 714/716, 712; 375/224, 375/206, 347, 348, 221, 219, 226, 267, 345; 370/335, 342, 13, 15, 16; 342/165, 294, 342/194, 174, 173

See application file for complete search history.

(56) References Cited

U.S. PATENT DOCUMENTS

| | | | | |
|---|---|---|---|---|
| 3,862,380 | A | | 1/1975 | Hekimian et al. ..... 179/175.3 R |
| 4,028,622 | A | | 6/1977 | Evans et al. ............... 324/57 N |
| 4,580,262 | A | * | 4/1986 | Naylor et al. ................ 714/708 |
| 4,648,124 | A | * | 3/1987 | Mantovani et al. ....... 455/67.13 |
| 4,918,684 | A | | 4/1990 | Boschet et al. ................ 370/17 |
| 5,337,316 | A | * | 8/1994 | Weiss et al. ................. 714/716 |
| 5,930,707 | A | * | 7/1999 | Vambaris et al. ........... 455/424 |
| 6,070,086 | A | | 5/2000 | Dobrica |
| 6,070,091 | A | | 5/2000 | Hogevik ...................... 455/561 |
| 6,108,351 | A | | 8/2000 | Hardy et al. ................. 370/491 |
| 6,253,060 | B1 | * | 6/2001 | Komara et al. ................ 455/9 |
| 6,356,207 | B1 | | 3/2002 | Oouchi ....................... 340/928 |
| 2002/0042290 | A1 | * | 4/2002 | Williams et al. ............ 455/562 |
| 2002/0173331 | A1 | * | 11/2002 | Noh ............................ 455/522 |
| 2004/0037353 | A1 | * | 2/2004 | Henriksson .................. 375/224 |

FOREIGN PATENT DOCUMENTS

WO    WO 97/39597    10/1997

OTHER PUBLICATIONS

Barlow et al., "*RF Loopback Circuit Facilitates Remote BER Testing of Base Station*", Motorola Technical Developments, Motorola Inc., vol. 38, XP000906017, ISSN: 0887-5286, pp. 20-21, Jun. 1999.
Nishimori et al., "*Automatic Calibration Method of Adaptive Array for FDD Systems*", IEEE Conference Proceedings, vol. 2, XP010514686, pp. 910-913, Jul. 16, 2000.
Lau et al., "*Calculation of Third Order Intermodulation Spectrum*", Electronics Letters, IEE Stevenage, GB, vol. 26, No. 21, XP000109655, pp. 1776-1778, Oct. 11, 1990.

* cited by examiner

*Primary Examiner*—Edward F. Urban
*Assistant Examiner*—Charles Chow
(74) *Attorney, Agent, or Firm*—Fulbright & Jaworski LLP

(57) ABSTRACT

A method includes communicating a first signal at a transmitter. The first signal has a first frequency. The method also includes receiving a second signal at a receiver. The second signal has a second frequency, and the second signal comprises the first signal converted from the first frequency to the second frequency. In addition, the method includes determining whether the transmitter and receiver are functional using at least one of the first and second signals.

18 Claims, 3 Drawing Sheets

SYSTEM AND METHOD FOR TESTING TRANSCEIVERS

GOVERNMENT LICENSE RIGHTS

This invention was made with U.S. Government support. The U.S. Government has certain rights in the invention.

TECHNICAL FIELD

This disclosure relates generally to the field of communication systems, and more particularly to a system and method for testing transceivers.

BACKGROUND

Communication devices typically include multiple transmitters and receivers. For example, military surveillance aircraft often include many different transceivers, some of which are used for observation and some of which are used for communication. It is often useful to determine whether the transceivers are functioning properly. As an example, technicians may wish to test the transmitters and receivers onboard the military surveillance aircraft before the aircraft is launched on a mission. Testing the transceivers typically requires that additional hardware be provided. The additional hardware communicates with a transceiver to test whether the transceiver can transmit and receive information properly.

SUMMARY

The present disclosure provides a system and method for testing transceivers. In particular, the transceivers may be tested for operational readiness using the equipment already available in a communication device or in a communication network.

In one embodiment, a method includes communicating a first signal at a transmitter. The first signal has a first frequency. The method also includes receiving a second signal at a receiver. The second signal has a second frequency, and the second signal comprises the first signal converted from the first frequency to the second frequency. In addition, the method includes determining whether the transmitter and receiver are functional using at least one of the first and second signals.

In a particular embodiment, the second signal comprises an intermodulation product produced using the first signal. In another particular embodiment, a mixer produces the intermodulation product and operates at a third frequency, the intermodulation product comprises a third-order intermodulation product, and the second frequency equals twice the third frequency minus the first frequency.

One or more technical advantages may be provided according to various embodiments of this disclosure. Particular embodiments of this disclosure may exhibit none, some, or all of the following advantages. For example, in one embodiment, a method for testing transceivers is provided. In particular, one transceiver may generate and communicate a test signal. A second transceiver may receive the test signal, and the nonlinear behavior of the second transceiver creates an echo test signal. The echo test signal can be received and processed by the first transceiver. By comparing the test signal and the echo test signal, the first transceiver can test itself for operational readiness. By using the first and second transceivers to test the first transceiver, the transceiver can be tested using the equipment already available in the device or network.

Other technical advantages will be readily apparent to one skilled in the art from the following figures, descriptions, and claims.

BRIEF DESCRIPTION OF THE DRAWINGS

For a more complete understanding of this disclosure, reference is now made to the following descriptions, taken in conjunction with the accompanying drawings, in which.

DETAILED DESCRIPTION OF EXAMPLE EMBODIMENTS

Figure 1:
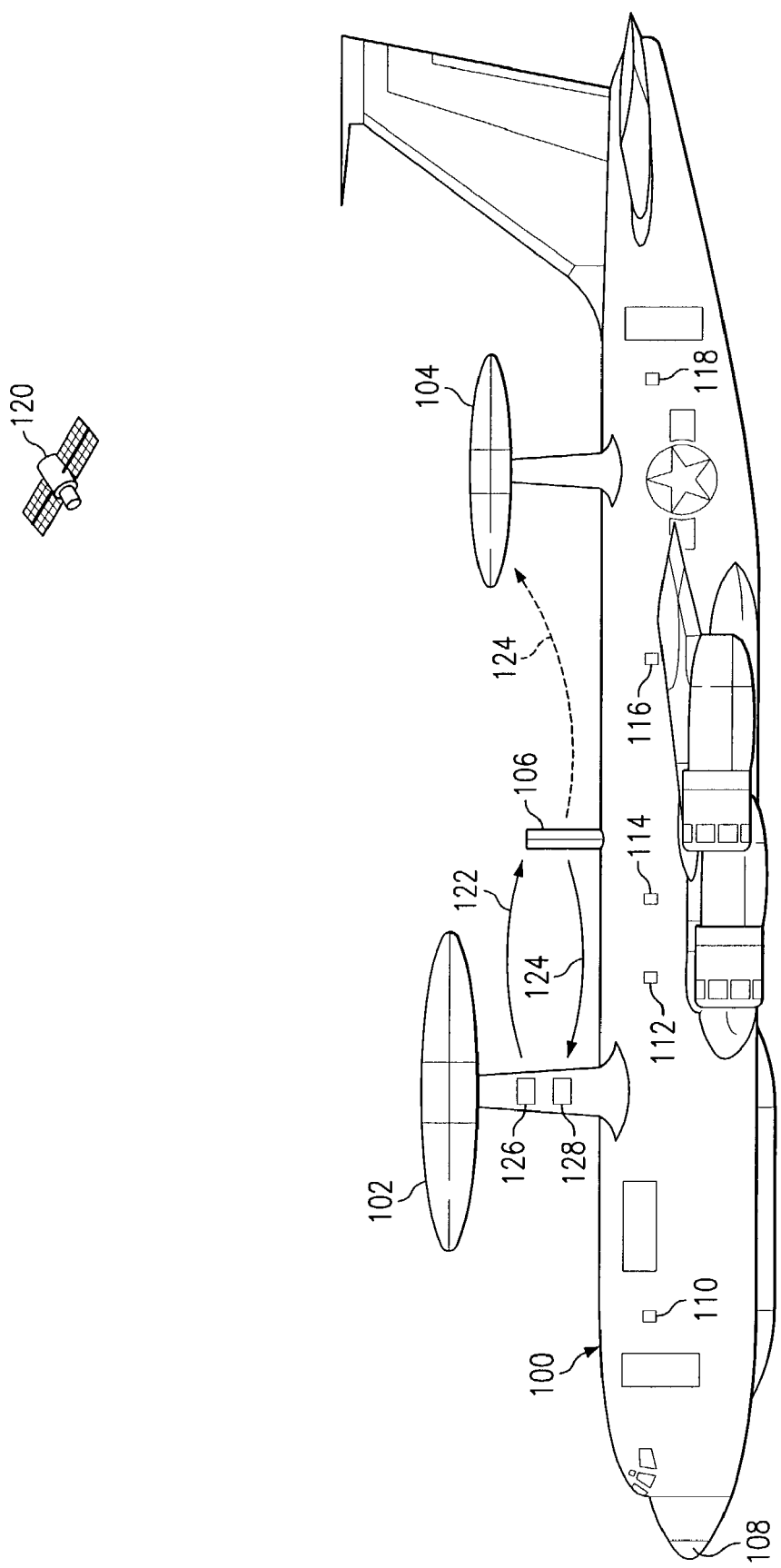
FIG. 1 illustrates an example system for testing a transceiver according to one embodiment of this disclosure.

FIG. 1 illustrates an example system 100 for testing a transceiver according to one embodiment of this disclosure. In the illustrated embodiment, system 100 represents a military surveillance aircraft having a plurality of transceivers 102–118. Each transceiver 102–118 may include a transmitter 126, a receiver 128, or a transmitter-receiver combination.

In this embodiment, transceivers 102, 104 represent satellite communication transceivers. Transceivers 102, 104 communicate with one or more satellites 120 in earth orbit. In a particular embodiment, transceivers 102, 104 may communicate with satellites 120 using one or more modulation techniques, such as satellite communication (SATCOM) Binary Phase-Shift Keying (BPSK), Quadrature Phase-Shift Keying (QPSK), or their continuous phase variants.

Transceiver 106 represents a continuous wave (CW) transceiver. Transceiver 106 may, for example, represent an Amplitude Modulation (AM) voice transmitter operating in continuous wave unmodulated mode.

The additional transceivers 108–118 may perform any other suitable function in system 100. For example, the additional transceivers 108–118 may be used to perform electronic surveillance, track airborne or ground targets, or communicate with another command and control center.

In one embodiment, transceivers 102–118 operate in a common frequency band. In particular embodiments, the transceivers 102–118 transmit and receive over communication channels in the L-band, the Ultra High Frequency (UHF), or the Very High Frequency (VHF) bands. Transceivers 102–118 typically communicate at one or more fundamental frequencies. Because a transceiver 102–118 exhibits non-linear behavior, that transceiver 102–118 can generate signals at additional frequencies. For example, a transceiver 102–118 may generate a harmonic, which represents a signal having a frequency that is an integral multiple of a fundamental frequency. The signals at a transceiver 102–118 could also undergo intermodulation, which produces a signal having a frequency corresponding to the sum of or difference between two fundamental and/or harmonic frequencies. The frequencies produced by intermodulation are called intermodulation products. Different frequencies may represent different-order intermodulation products. As a particular example, a frequency could represent a third-order intermodulation product. The intermodulation products produced by a transceiver 102–118 can often interfere with the proper operation of transceivers 102–118. As a result, steps are often taken to reduce or eliminate the effects of the intermodulation products in communication systems.

In one embodiment, transceiver 102 may undergo an operational test to determine whether transceiver 102 is functioning properly. To test transceiver 102, a transmitter 126 in transceiver 102 generates and communicates a test signal 122 over a communication channel in the frequency band used by transceiver 102. In one embodiment, the test signal 122 represents a modulated signal, such as a modulated voice or data signal. In a particular embodiment, the test signal 122 represents a SATCOM BPSK signal, and transmitter 126 transmits at a frequency $f_2$.

In one embodiment, transceiver 106 operates to receive test signal 122. In a particular embodiment, transceiver 106 operates in continuous wave mode at a frequency of $f_1$, where $f_1 < f_2$. In this embodiment, transceiver 106 receives the test signal 122 as out-of-band interference. Because transceiver 106 exhibits non-linear behavior, the receipt of test signal 122 by transceiver 106 produces an echo test signal 124. In one embodiment, echo test signal 124 represents an intermodulation product produced by transceiver 106. In a particular embodiment, echo test signal 124 represents a third-order intermodulation product. The third-order intermodulation product may have a frequency of $f_3$, such as approximately $2f_1 - f_2$. In effect, transceiver 106 acts as a mixer that performs a down frequency conversion, transposing the test signal 122 from a frequency of $f_2$ to a frequency of $2f_1 - f_2$. This third-order intermodulation product gets radiated back to transceiver 102 as an echo test signal 124. Instead of or in addition to being radiated back to transceiver 102, this third-order intermodulation product could also be radiated to another transceiver, such as transceiver 104.

At transceiver 102, the receiver 128 receives the echo signal 124 from transceiver 106. The echo signal 124 has a frequency of $f_3$, which falls within a communication channel used by receiver 128. Transceiver 102 may therefore receive and analyze the echo test signal 124. If transceiver 102 is able to transmit and receive signals properly, the echo test signal 124 may contain the same information as test signal 122. This gives an indication of whether transceiver 102 is operationally ready for service.

The power of the test signal 122 generated by transceiver 102 may vary depending, among other things, on the distance between transceivers 102, 106. In one embodiment, the test signal 122 has a two watt power level, and transceiver 106 comprises a twenty five watt transmitter. Test signal 122 could also have any suitable data rate, such as 19.2 kilobits per second. Using a two watt test signal 122 having a data rate 19.2 kilobits per second, the echo signal 124 could have an energy-per-bit-to-noise ratio ($E_b/N_o$) of 7 dB. This may be sufficient to provide a bit error rate (BER) of $10^{-3}$.

In a particular embodiment, SATCOM transceiver 102 includes an antenna, a Low Noise Amplifier (LNA), and a diplexer. In this embodiment, the twenty five watt UHF transmitter direct interference power into the SATCOM LNA is attenuated approximately 40 dB by the SATCOM diplexer and approximately 32 dB by the antenna isolation. Therefore, in this embodiment, interference power $P_{int}$ in the LNA is approximately −28 dBm. This may be within the dynamic range of a high-power SATCOM LNA and cause little or no adverse signal effects as weak signal suppression. Also, the UHF transmitter broadband noise into the SATCOM LNA is attenuated approximately 32 dB by the antenna isolation mentioned above. The SATCOM transmitter frequency may be offset from the SATCOM receiver frequency by more than 10 MHz, which gives a typical UHF transmitter broadband noise density of approximately −142 dBm/Hz. The UHF broadband noise interference power at the SATCOM transceiver 102 is approximately $N_{BBN} = -174$ dBm/Hz. This noise floor may degrade the SATCOM sensitivity by about 1.3 dB, which should not affect the functionality test.

This method of testing transceiver 102 could further be used to test the sensitivity of the receiver 128 in transceiver 102. Returning to the above example, the power level of test signal 122 could be set higher than two watts and then reduced until the desired bit error rate, such as $10^{-3}$, is achieved. The power level of test signal 122 helps identify whether the receiver 128 in transceiver 102 has suitable sensitivity. In general, higher power levels of test signal 122 may indicate poorer sensitivity in receiver 128 of transceiver 102.

As a particular example, transceiver 106 transmits normally at a fundamental frequency of 280 MHz ($f_1$). Transceiver 102 generates a test signal 122 at a frequency of 292.95 MHz ($f_2$). If the transmitter 126 in transceiver 102 is operating properly, the test signal 122 is communicated to transceiver 106. The non-linear behavior of transceiver 106 produces echo signal 124 as a third-order intermodulation product. Echo signal 124 has a frequency $f_3$ of (2*280 MHz–292.95 MHz), or 267.05 MHz. If the receiver 128 in transceiver 102 is operating properly, the 267.05 MHz echo signal 124 is received and processed by transceiver 102. By comparing the echo signal 124 to the test signal 122, transceiver 102 may determine whether the transmitter 126 and receiver 128 in transceiver 102 are operating correctly.

In this particular example, transceiver 102 operates using the SATCOM 102/104 functionality, and transceiver 106 represents a UHF transceiver. The transmitter 126 may use any suitable power level to communicate test signal 122. If transceiver 106 includes a Frequency Agile Filter (FAF), the link margin may vary depending on the selectivity of the frequency agile filter. For example, the selectivity of the frequency agile filter tuned to 280 MHz in transceiver 106 may increase as the transmit frequency ($f_2$) of transmitter 126 increases. As particular examples, if the transmit frequency of transmitter 126 is 297 MHz and the receive frequency of receiver 128 is 263 MHz, the selectivity of the frequency agile filter increases. This could reduce the link margin, which might prevent the transmit power of transmitter 126 from being reduced. On the other hand, if the transmit frequency of transmitter 126 is 291 MHz and the receive frequency of receiver 128 is 269 MHz, the selectivity of the frequency agile filter decreases. This could increase the link margin, which allows the transmit power of transmitter 126 to be reduced.

Although FIG. 1 illustrates one example of a system 100 for testing a transceiver, various changes may be made to system 100. For example, FIG. 1 illustrates one example environment in which a transceiver 102 can be tested. Any other environment that includes a transmitter 126, a receiver 128, and a transmitter/mixer can be used. Also, FIG. 1 illustrates the tested transmitter 126 and receiver 128 residing in a single transceiver 102. The tested transmitter 126 and receiver 128 could also represent separate components that do not form a single transceiver. Further, multiple transceivers 102, 104 could receive echo test signal 124 and determine whether a receiver is operationally ready for service. In addition, while FIG. 1 has been described as testing a SATCOM transceiver 102 using a UHF transceiver 106, other transceivers could be used.

Figure 2:
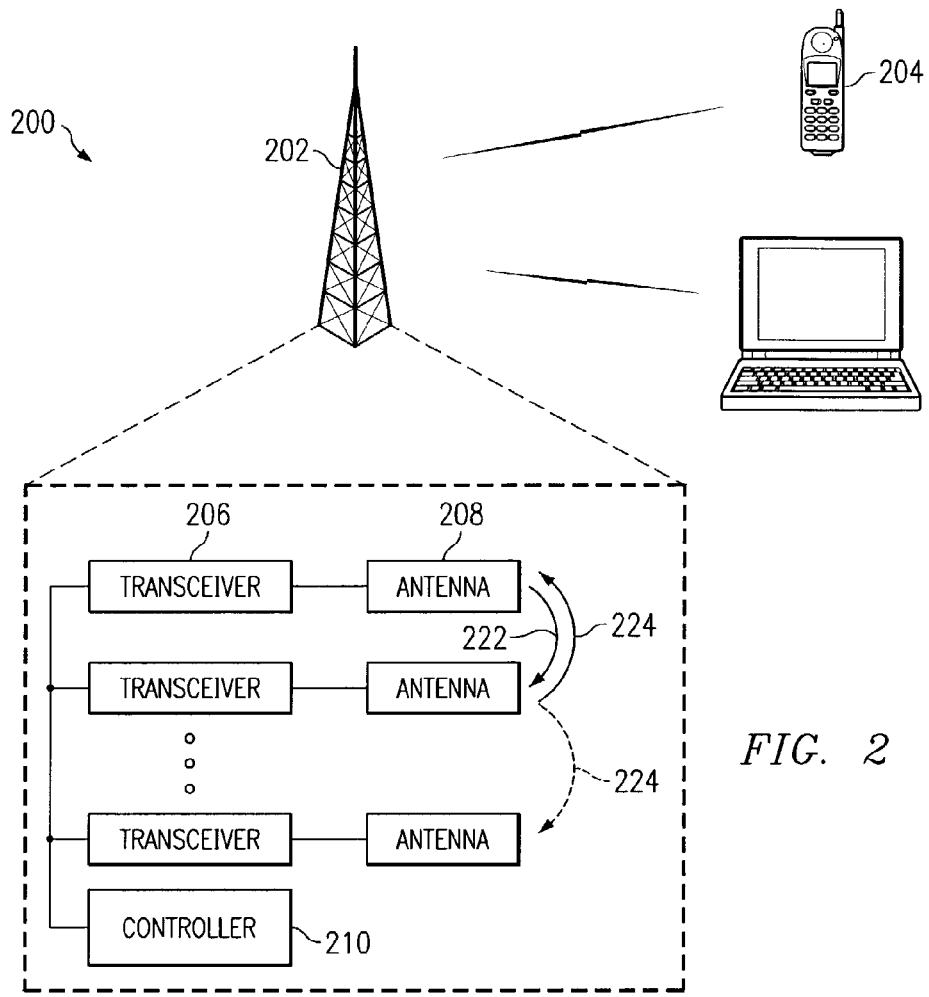
FIG. 2 illustrates another example system for testing a transceiver according to one embodiment of this disclosure.

FIG. 2 illustrates another example system 200 for testing a transceiver according to one embodiment of this disclosure. In the illustrated embodiment, system 200 represents a base station 202 that communicates with one or more wireless devices 204. Base station 202 may, for example, represent a cellular base station or other base station.

In this embodiment, base station 202 includes a plurality of transceivers 206, a plurality of antennas 208, and a controller 210. Transceivers 206 are operable to communicate with one or more wireless devices 204. Wireless devices 204 could, for example, represent mobile telephones, computing devices with a wireless interface, or other suitable devices. In particular embodiments, transceivers 206 may communicate with wireless devices 204 using Frequency Division Multiple Access (FDMA), Time Division Multiple Access (TDMA), or Code Division Multiple Access (CDMA) techniques. Transceivers 206 could also communicate using various modulation techniques, such as Frequency Shift Keying (FSK) or Phase Shift Keying (PSK). Transceiver 206 may represent any suitable transmitter, receiver, or transmitter-receiver combination operable to communicate with one or more wireless devices 204.

Antenna 208 is coupled to transceiver 206. In this specification, the term "couple" refers to any direct or indirect communication between two or more components, whether or not those components are in physical contact with one another. Antenna 208 is operable to communicate and receive information over a wireless interface. For example, antenna 208 could receive signals from transceiver 206 and communicate the signals to a wireless device 204. Antenna 208 could also receive signals from wireless device 204 and forward the signals to transceiver 206 for processing. Antenna 208 may include any suitable structure operable to communicate over a wireless interface. Antenna 208 may, for example, form a portion of a base station antenna array. Although FIG. 2 illustrates one antenna 208 coupled to each transceiver 206, other embodiments of base station 202 may be used. For example, multiple transceivers 206 could be coupled to each antenna 208.

Controller 210 is coupled to transceivers 206. Controller 210 is operable to control the operation and behavior of transceivers 206. For example, controller 210 may initiate testing of transceivers 206. Controller 210 could also receive the test results and make the results available to a remote or other user. As a particular example, if a transceiver 206 fails the test, controller 210 could generate an alarm to notify the appropriate personnel of the problem. Controller 210 may include any suitable processing device or devices.

In one aspect of operation, a first transceiver 206 generates and communicates a test signal 222, and a second transceiver 206 receives test signal 222. Because of non-linearities in the second transceiver 206, an intermodulation product forms and is radiated back to the first transceiver 206 as echo test signal 224. The echo test signal 224 may, for example, represent a third-order intermodulation product. The first transceiver 206 may then receive the echo test signal 224. If the first transceiver 206 is operating properly, the test signal 222 and the echo test signal 224 should contain the same information. Other or additional transceivers 206 could also receive echo test signal 224. For example, the echo test signal 224 could be received and processed by one, some, or all transceivers 206 in system 200.

Although FIG. 2 illustrates another example of a system 200 for testing a transceiver, various changes may be made to system 200. For example, FIG. 2 illustrates another example environment is which a transceiver 206 can be tested. Other operational environments could be used. Also, base station 202 could include any suitable number of transceivers 206 and antennas 208.

Figure 3:
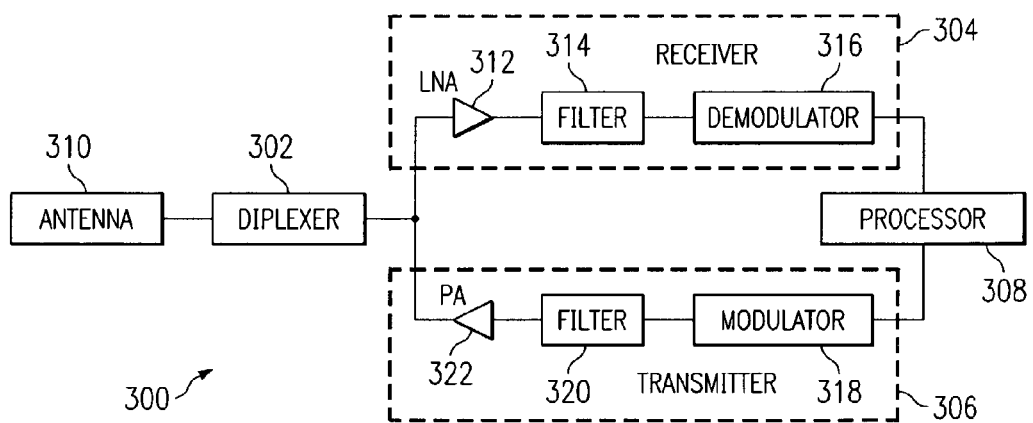
FIG. 3 illustrates an example transceiver according to one embodiment of this disclosure.

FIG. 3 illustrates an example transceiver 300 according to one embodiment of this disclosure. Transceiver 300 may be useful, for example, as transceiver 102, 104 of FIG. 1 or transceiver 206 of FIG. 2. In the illustrated example, transceiver 300 includes a diplexer 302, a receiver 304, a transmitter 306, and a processor 308. The transceiver 300 illustrated in FIG. 3 has been simplified for ease of illustration and explanation. Other embodiments of transceiver 300 may also be used.

Diplexer 302 is coupled to receiver 304, transmitter 306, and an antenna 310. Diplexer 310 facilitates access to and from antenna 310 by receiver 304 and transmitter 306. For example, in one embodiment, receiver 304 and transmitter 306 of transceiver 300 may operate using two separate frequency bands. In this embodiment, diplexer 302 allows transmitter 306 to communicate information to antenna 310 using one of the frequency bands while allowing receiver 304 to receive information from antenna 310 using the other frequency band. In another embodiment, receiver 304 and transmitter 306 may operate on the same frequency band, such as in a time division system. For example, transceiver 300 could transmit information in some time blocks and receive information in other time blocks. In this embodiment, diplexer 302 may alternately couple receiver 304 and transmitter 306 to antenna 310 during the appropriate time blocks. Diplexer 302 may include any hardware, software, firmware, or combination thereof for facilitating the transmission and reception of information over antenna 310.

In the illustrated example, receiver 304 includes an amplifier 312, a filter 314, and a demodulator 316. Amplifier 312 is coupled to diplexer 302 and filter 314. Amplifier 312 receives incoming signals received by antenna 310 and amplifies the signals. Amplifier 312 also communicates the amplified signals to filter 314. Amplifier 312 may include any hardware, software, firmware, or combination thereof for amplifying input signals. In one embodiment, amplifier 312 includes a low noise amplifier that amplifies input signals without adding excessive noise to the amplified signals.

Filter 314 is coupled to amplifier 312 and demodulator 316. Filter 314 receives the amplified input signal generated by amplifier 312. Filter 314 also filters the amplified input signals to help reduce or eliminate extraneous signals, such as noise, contained in the input signals. Filter 314 may include any hardware, software, firmware, or combination thereof for filtering input signals. In one embodiment, filter 314 includes a high-pass filter or a band-pass filter.

Demodulator 316 is coupled to filter 314 and processor 308. Demodulator 316 receives the filtered input signals from filter 314. Demodulator 316 also demodulates the input signals. For example, the input signals received by receiver 304 may contain information modulated onto a carrier wave. Demodulator 316 may demodulate the input signals by extracting the information from the input signals and generating a square wave or a digital bit stream that contains the information. Demodulator 316 communicates the digital information to processor 308 for processing. Demodulator 316 may include any hardware, software, firmware, or combination thereof for demodulating input signals. Demodulator 316 may be able to demodulate input signals that contain information modulated using any suitable modulation technique, such as FSK, PSK, SATCOM BPSK, or SATCOM QPSK modulation.

In the illustrated embodiment, transmitter 306 includes a modulator 318, a filter 320, and an amplifier 322. Modulator 318 is coupled to filter 320 and processor 308. Modulator 318 receives information to be communicated over antenna 310 from processor 308. Modulator 318 also modulates the information onto a carrier wave, which may be communicated over antenna 310. Modulator 318 may use any suitable modulation technique, such as PSK, FSK, SATCOM BPSK, or SATCOM QPSK modulation. Modulator 318 communicates the carrier wave to filter 320. Modulator 318 may include any hardware, software, firmware, or combination thereof for modulating output signals.

Filter 320 is coupled to amplifier 322 and modulator 318. Filter 320 receives the output signals generated by modulator 318. Filter 320 also filters the generated output signals to help reduce or eliminate extraneous signals contained in the output signals. Filter 320 may include any hardware, software, firmware, or combination thereof for filtering output signals. In one embodiment, filter 320 includes a high-pass filter or a band-pass filter.

Amplifier 322 is coupled to diplexer 302 and filter 320. Amplifier 322 receives output signals from filter 320 and amplifies the signals. Amplifier 322 also communicates the amplified signals to diplexer 302. Amplifier 322 may include any hardware, software, firmware, or combination thereof for amplifying output signals. In one embodiment, amplifier 322 includes a power amplifier.

Processor 308 is coupled to receiver 304 and transmitter 306. Processor 308 may receive incoming information from receiver 304 and process the information. Processor 308 can also generate and communicate information to transmitter 306 for transmission. Processor 308 may include any suitable processing device or devices.

In one aspect of operation, transceiver 300 may represent a transceiver being tested. In this embodiment, transceiver 300 could generate a test signal. This may include, for example, processor 308 generating information that is modulated, filtered, and amplified by transmitter 306. The test signal may then be radiated by antenna 310.

An echo test signal may also be received by the antenna 310. The echo test signal is sent to receiver 304 of the transceiver 300, where the signal is amplified, filtered, and demodulated. Processor 308 may receive the information contained in the echo test signal, compare the information with the information transmitted in the test signal, and determine whether transceiver 300 is operationally ready for service.

Although FIG. 3 illustrates one example of a transceiver 300, various changes may be made to transceiver 300. For example, FIG. 3 illustrates a simplified embodiment of transceiver 300. Various components can be added, removed, or combined according to particular needs.

Figure 4:
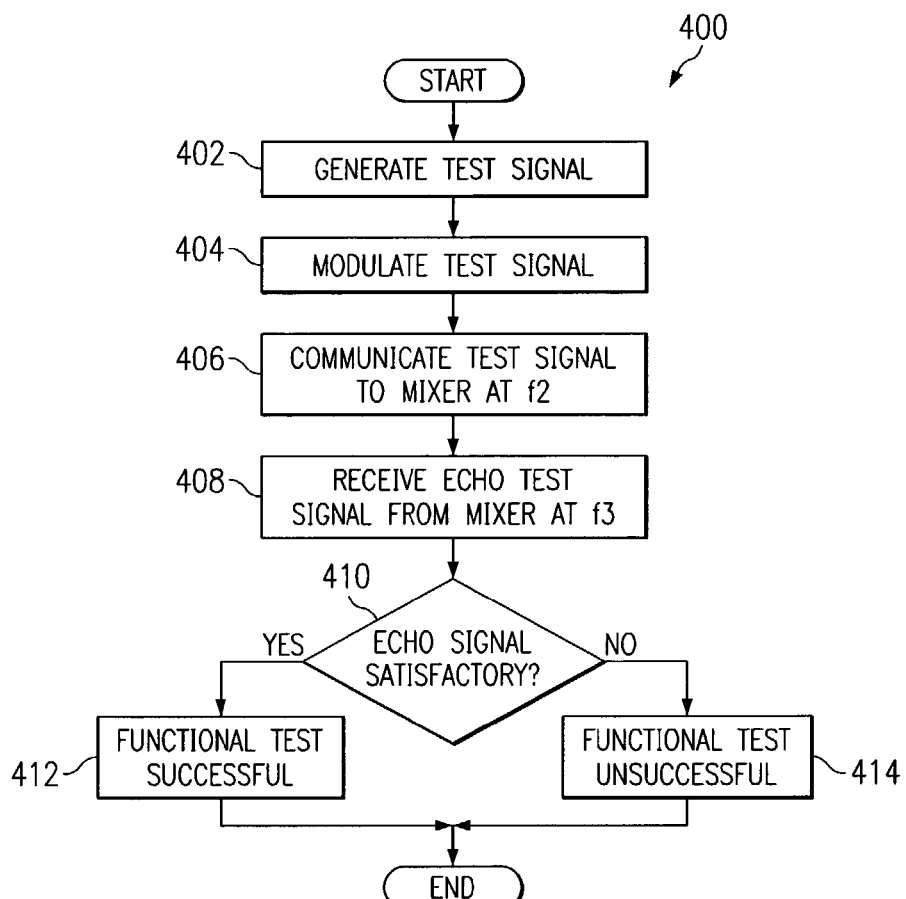
FIG. 4 illustrates an example method for testing a transceiver according to one embodiment of this disclosure.

FIG. 4 illustrates an example method 400 for testing a transceiver according to one embodiment of this disclosure. Method 400 is described with respect to transceiver 300 of FIG. 3. Method 400 could also be used with any other suitable transceiver in any suitable system.

Transceiver 300 generates a test signal at step 402. This may include, for example, processor 308 generating information, such as a predefined test code or other information, and communicating the information to transmitter 306. Transceiver 300 modulates the test signal at step 404. This may include, for example, modulator 318 receiving the information from processor 308. This may also include modulator 318 modulating the information onto a carrier wave using any suitable modulation technique, such as FSK, PSK, SATCOM BPSK, or SATCOM QPSK modulation. This may further include filter 320 filtering the modulated signal and amplifier 322 amplifying the filtered signal. Transceiver 300 communicates the test signal to a mixer at step 406. This may include, for example, diplexer 302 receiving the test signal from transmitter 306 and communicating the signal to antenna 310. This may also include the test signal being communicated by antenna 310 at a frequency $f_2$. The mixer may, for example, represent transceiver 106 of FIG. 1 or a transceiver 206 of FIG. 2.

Transceiver 300 receives an echo test signal at step 408. This may include, for example, antenna 310 receiving the echo test signal and diplexer 302 forwarding the signal to receiver 304. This may also include the echo test signal being received by antenna 310 at a frequency $f_3$. In a particular embodiment, the echo test signal represents a third-order intermodulation product having a frequency $f_3$ of approximately $2f_1-f_2$. This may further include receiver 304 amplifying, filtering, and demodulating the echo test signal.

Transceiver 300 determines whether the echo test signal is satisfactory at step 410. This may include, for example, processor 308 comparing the information contained in the echo test signal with the information placed in the original test signal. This may also include processor 308 determining that transceiver 300 is operationally ready for service when the information contained in the test signal and the echo test signal match. If the echo test signal is determined to be satisfactory, transceiver 300 determines that the functional test is successful at step 412. Otherwise, transceiver 300 determines that the functional test is unsuccessful at step 414.

Although FIG. 4 illustrates one example of a method 400 for testing a transceiver, various changes may be made to method 400. For example, steps 402–406 could be performed by one transceiver 300, and steps 408–414 could be performed in another transceiver 300. Also, transceiver 300 may but need not modulate the test signal at step 404.

Figure 5:
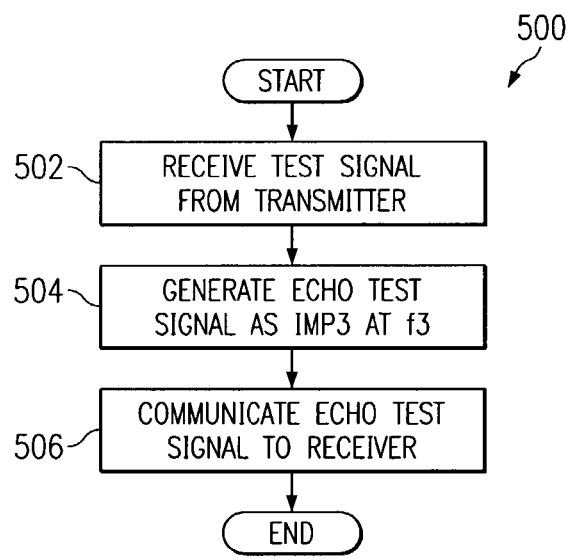
FIG. 5 illustrates an example method for facilitating the testing of a transceiver according to one embodiment of this disclosure.

FIG. 5 illustrates an example method 500 for facilitating the testing of a transceiver according to one embodiment of this disclosure. Method 500 is described with respect to transceiver 106 of FIG. 1. Method 500 could also be used with any other suitable transceiver in any other suitable system.

Transceiver 106 receives a test signal from a transmitter at step 502. This may include, for example, transceiver 106 receiving the test signal at a frequency $f_2$. Transceiver 106 generates an echo test signal at step 504. This may include, for example, the non-linear behavior of transceiver 106 generating an intermodulation product. In a particular embodiment, transceiver 106 communicates at a frequency $f_1$, and the non-linear behavior of transceiver 106 generates a third-order intermodulation product having a frequency $f_3$ of approximately $2f_1-f_2$. The echo test signal is radiated to a receiver at step 506. This may include, for example, transceiver 106 radiating the echo test signal to a receiver co-located in the same transceiver as the transmitter that generated the original test signal. This may also include transceiver 106 radiating the echo test signal to a receiver at a different location than the transmitter that generated the original test signal.

Although FIG. 5 illustrates one example of a method 500 for facilitating the testing of a transceiver, various changes may be made to method 500. For example, the echo test signal could represent a signal other than a third-order intermodulation product.

While the present disclosure has been described in terms of certain embodiments and generally associated methods, alterations and permutations of the embodiments and methods will be apparent to those skilled in the art. Accordingly, the above description of example embodiments does not define or constrain the present disclosure. Other changes, substitutions, and alterations are also possible without departing from the spirit and scope of the present disclosure, as defined by the following claims.

What is claimed is:

1. A method, comprising:
    communicating a first signal at a transmitter, the first signal having a first frequency;
    transmitting the first signal using an antenna;
    receiving a second signal at a receiver, the second signal having a second frequency, the second signal comprising an intermodulation product produced using an echo of the first signal, converted from the first frequency to the second frequency by means of the echo; and
    determining whether the transmitter and receiver are functional using the second signal.

2. The method of claim 1, wherein:
    a mixer produces the intermodulation product, the mixer operating at a third frequency;
    the intermodulation product comprises a third-order intermodulation product; and
    the second frequency equals twice the third frequency minus the first frequency.

3. The method of claim 1, wherein the first signal comprises a modulated signal.

4. The method of claim 1, wherein the transmitter and receiver form at least a portion of a single transceiver.

5. The method of claim 1, wherein the transmitter is physically separate from the receiver.

6. The method of claim 1, wherein determining whether the transmitter and receiver are functional comprises at least one of comparing contents of the first and second signals and determining a sensitivity of the receiver using a power level of the transmitter.

7. An apparatus, comprising:
    a transmitter operable to communicate a first signal, the first signal having a first frequency;
    a receiver connected to an antenna operable to receive a second signal, the second signal communicated from the antenna to the receiver and having a second frequency, the second signal comprising an intermodulation product produced using an echo of the first signal converted from the first frequency to the second frequency by means of the echo; and
    a processor operable to determine whether the transmitter and receiver are functional using the second signal.

8. The apparatus of claim 7, wherein:
    a mixer produces the intermodulation product, the mixer operating at a third frequency;
    the intermodulation product comprises a third-order intermodulation product; and
    the second frequency equals twice the third frequency minus the first frequency.

9. The apparatus of claim 7, wherein the transmitter comprises:
    a modulator operable to receive information from the processor and modulate the information onto a carrier wave, the carrier wave comprising the first signal;
    a filter coupled to the modulator and operable to receive and filter the first signal; and
    an amplifier coupled to the filter and operable to amplify the first signal.

10. The apparatus of claim 7, wherein the receiver comprises:
    an amplifier operable to receive and amplify the second signal;
    a filter coupled to the amplifier and operable to receive and filter the second signal; and
    a demodulator coupled to the filter and operable to receive and demodulate the second signal.

11. The apparatus of claim 7, wherein the processor is operable to determine whether the transmitter and receiver are functional by at least one of comparing contents of the first and second signals and determining a sensitivity of the receiver using a power level of the transmitter.

12. The apparatus of claim 11, wherein the processor is operable to determine the sensitivity of the receiver by:
    setting a power level of the transmitter to a first setting;
    reducing the power level of the transmitter until a specified bit error rate is achieved, the specified bit error rate achieved at a second power level; and
    comparing the second power level to a threshold level to determine whether the sensitivity of the receiver is acceptable.

13. A method, comprising:
    receiving a first signal radiated from a transmitter, the first signal having a first frequency ($f_1$);
    generating a second signal, the second signal having a second frequency ($f_2$), the second signal comprising a third order intermodulation product produced using the first signal;
    radiating the second signal to a receiver; and
    determining whether the transmitting and receiving are functional using the second signal.

14. The method of claim 13, wherein the third order intermodulation product has a third frequency of approximately $2f_1-f_2$.

15. The method of claim 14, wherein:
    a mixer produces the third order intermodulation product, the mixer operating at the third frequency.

16. The method of claim 13, wherein the transmitter and receiver form at least a portion of a single transceiver.

17. The method of claim 13, wherein the transmitter is physically separate from the receiver.

18. A method, comprising:
    communicating a modulated first signal from a transmitter to a mixer, the first signal having a first frequency;
    generating at the mixer a second signal, the mixer operating at a second frequency, the second signal comprising a third-order intermodulation product having a third frequency that equals twice the first frequency minus the second frequency;
    receiving the second signal at a receiver; and
    determining whether the transmitter and receiver are functional by at least one of comparing contents of the first and second signals and determining a sensitivity of the receiver using a power level of the transmitter.

* * * * *